United States Patent
Reese

(10) Patent No.: US 10,300,674 B2
(45) Date of Patent: May 28, 2019

(54) PROFILE PART WITH A PLURALITY OF LAYERS

(71) Applicant: Daimler AG, Stuttgart (DE)

(72) Inventor: Eckhard Reese, Apensen (DE)

(73) Assignee: Daimler AG, Stuttgart (DE)

( * ) Notice: Subject to any disclaimer, the term of this patent is extended or adjusted under 35 U.S.C. 154(b) by 149 days.

(21) Appl. No.: 15/537,211

(22) PCT Filed: Nov. 27, 2015

(86) PCT No.: PCT/EP2015/002394
§ 371 (c)(1),
(2) Date: Jun. 16, 2017

(87) PCT Pub. No.: WO2016/096093
PCT Pub. Date: Jun. 23, 2016

(65) Prior Publication Data
US 2018/0036991 A1 Feb. 8, 2018

(30) Foreign Application Priority Data

Dec. 19, 2014 (DE) .......................... 10 2014 019 149

(51) Int. Cl.
*B32B 1/00* (2006.01)
*B32B 1/08* (2006.01)
(Continued)

(52) U.S. Cl.
CPC ................ *B32B 1/08* (2013.01); *B29C 70/52* (2013.01); *B32B 1/00* (2013.01); *B32B 5/02* (2013.01);
(Continued)

(58) Field of Classification Search
CPC .... B32B 1/08; B32B 5/02; B32B 5/12; B32B 5/26; B32B 7/02; B32B 27/06; B32B 27/08; B32B 27/28; B32B 27/281; B32B 27/286; B32B 27/288; B32B 27/302; B32B 27/304; B32B 27/308; B32B 27/32; B32B 27/322; B32B 27/34; B32B 27/36; B32B 27/365; B32B 1/00; B32B 2250/03; B32B 2260/046; B32B 2262/00; B32B 2262/0269; B32B 2262/10; B32B 2262/101; B32B 2262/106; B29C 70/52; B29K 2077/00; B29K 2309/08; B29L 2023/22
See application file for complete search history.

(56) References Cited

U.S. PATENT DOCUMENTS

2003/0175455 A1    9/2003  Erb et al.

FOREIGN PATENT DOCUMENTS

| CN | 103302927 A | 9/2013 |
|---|---|---|
| DE | 10 2011 018 422 A1 | 10/2012 |

(Continued)

OTHER PUBLICATIONS

Chinese Office Action issued in Chinese counterpart application No. 201580068735.0 dated Jun. 27, 2018, with partial English translation (Twelve (12) pages).

(Continued)

*Primary Examiner* — James C Yager
(74) *Attorney, Agent, or Firm* — Crowell & Moring LLP

(57) ABSTRACT

A profile part is disclosed. The profile part has a plurality of layers, each having a fiber reinforced plastic, where at least two layers differ in terms of at least one of the parameters characterizing the layers.

6 Claims, 2 Drawing Sheets

(51) Int. Cl.
| | |
|---|---|
| B32B 5/02 | (2006.01) |
| B32B 5/12 | (2006.01) |
| B32B 5/26 | (2006.01) |
| B32B 7/02 | (2019.01) |
| B32B 27/06 | (2006.01) |
| B32B 27/08 | (2006.01) |
| B32B 27/28 | (2006.01) |
| B32B 27/30 | (2006.01) |
| B32B 27/32 | (2006.01) |
| B32B 27/34 | (2006.01) |
| B32B 27/36 | (2006.01) |
| B29C 70/52 | (2006.01) |
| B29K 77/00 | (2006.01) |
| B29K 309/08 | (2006.01) |
| B29L 23/00 | (2006.01) |

(52) U.S. Cl.
CPC .......... *B32B 5/12* (2013.01); *B32B 5/26* (2013.01); *B32B 7/02* (2013.01); *B32B 27/06* (2013.01); *B32B 27/08* (2013.01); *B32B 27/28* (2013.01); *B32B 27/281* (2013.01); *B32B 27/286* (2013.01); *B32B 27/288* (2013.01); *B32B 27/302* (2013.01); *B32B 27/304* (2013.01); *B32B 27/308* (2013.01); *B32B 27/32* (2013.01); *B32B 27/322* (2013.01); *B32B 27/34* (2013.01); *B32B 27/36* (2013.01); *B32B 27/365* (2013.01); *B29K 2077/00* (2013.01); *B29K 2309/08* (2013.01); *B29L 2023/22* (2013.01); *B32B 2250/03* (2013.01); *B32B 2260/046* (2013.01); *B32B 2262/00* (2013.01); *B32B 2262/0269* (2013.01); *B32B 2262/10* (2013.01); *B32B 2262/101* (2013.01); *B32B 2262/106* (2013.01)

(56) References Cited

FOREIGN PATENT DOCUMENTS

| | | |
|---|---|---|
| DE | 20 2014 102 253 U1 | 7/2014 |
| DE | 10 2013 111 702 A1 | 4/2015 |
| EP | 0 308 237 B1 | 3/1989 |
| WO | WO 2007/090259 A1 | 8/2007 |

OTHER PUBLICATIONS

Ziqiang Mei, "Dictionary of Textiles", China Textile and Apparel Press, 1$^{st}$ Ed. Published Jan. 2007, p. 833, with brief statement of relevancy in English (four (4) total pages).

Li et al., "Composite Material Structure Design Basis", Wuhan University of Technology Press, 1$^{st}$ Ed. Published Nov. 1993, pp. 3-4, with brief statement of relevancy in English (five (5) total pages).

PCT/EP2015/002394, International Search Report dated Feb. 5, 2016 (Three (3) pages).

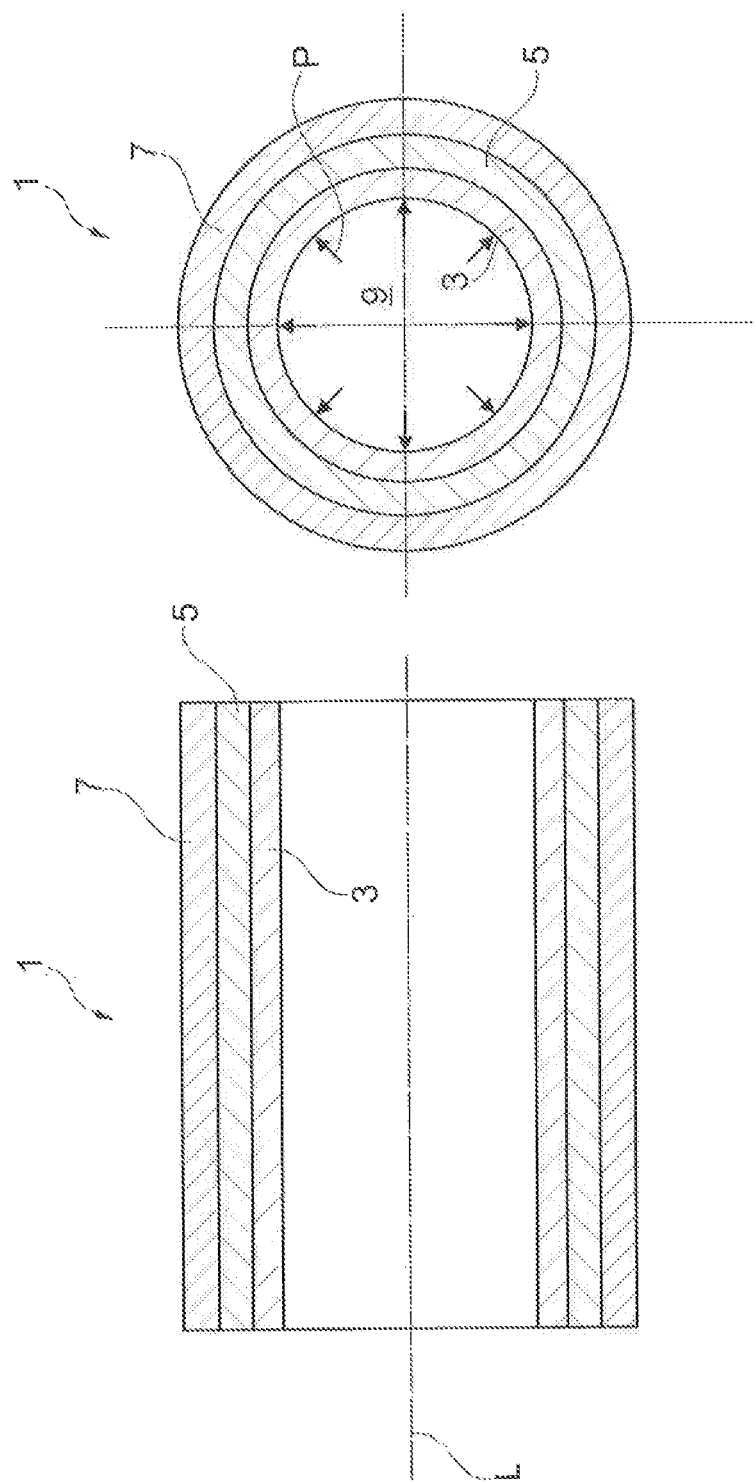

PROFILE PART WITH A PLURALITY OF LAYERS

BACKGROUND AND SUMMARY OF THE INVENTION

The invention relates to a profile part.

From the German patent application DE 10 2011 018 422 A1 a braid pultrusion method emerges, with which a multi-layer hollow profile braid is produced on a braiding mandrel by means of a braiding device from a plurality of hybrid rovings or fiber tapes, which comprise reinforcing fibers and thermoplastic matrix material. The hollow profile braid is removed from the braiding mandrel and fed in through a feed in matrix into a consolidation tool of a braid pultrusion machine by means of an extraction device downstream from the consolidation tool. An anti-friction coating is produced from the thermoplastic matrix material around the hollow profile braid, wherein the thermoplastic matrix material of the anti-friction coating exists heated at least to a glass transition temperature of the thermoplastic matrix material. Finally, the hollow profile braid is impregnated with the matrix material in the consolidation tool and consolidated, wherein the consolidation tool has tempering devices. The hollow profile braid produced thus can only be further processed in a limited manner. In particular, there is the risk that it will burst or tear during subsequent internal pressure deformation.

The object of the invention is to create a profile part which does not have the disadvantages. In particular, a profile part is to be created which is thermally deformable on the one hand, but, on the other hand, does not burst in a heated state during internal pressure deformation.

The profile part comprises a plurality of layers, wherein each of the layers has a fiber reinforced plastic. The profile part is characterized in that at least two layers differ in terms of at least one of the parameters characterizing the layers. In this way, it is possible to specifically adapt the profile part to various uses and/or processing methods and virtually tailor it thereto. The various layers can thus take on different functions.

It is preferably provided that the two layers, which differ in terms of at least one of the parameters characterizing the layers, differ in terms of their function. This allows an ideal adaptation of the profile part to its use and/or to further deformation steps. It is, for example, possible here that a first layer gives the profile part rigidity and/or strength, wherein a second layer is formed to be impermeable by gas such that it is particularly resistant to pressures and temperatures acting during internal pressure deformation.

During the internal pressure deformation of the profile part, a fluid or a hot gas, such as air, nitrogen, an inert gas or another suitable fluid is transported into the profile part and tensioned under pressure such that it expands until it abuts against a shaping tool. The deforming medium is typically removed once more after deforming. In this case, during internal pressure deformation, there is typically a pressure of up to about 600 bar and a temperature of about 150° C. to about 210° C.

In particular, a profile part is also preferred in which the at least one parameter characterizing the layers is chosen in terms of the different functions of the layers. In this way, the profile part is ideally adapted to its further processing or treatment and/or to the conditions existing during its use.

The profile part is preferably designed as a tubular semi-finished product, in particular as a hollow profile. The tubular semi-finished product is used in particular for producing a structural component for a vehicle body, in particular for a motor vehicle body, particularly preferably for the body of a heavy goods vehicle. In particular, it is preferably used for producing a support for a shell hatch of a heavy goods vehicle.

An exemplary embodiment of the profile part is preferred which is characterized in that at least one of the layers is made from a fiber reinforced plastic. Particularly preferably, each of the layers is made from a fiber reinforced plastic.

A fiber reinforced plastic material refers generally to a material having a matrix material, as well as fibers embedded therein. Particularly preferably, at least one of the layers has endless fibers or endless fiber bundles, so-called rovings, as reinforcing fibers. One exemplary embodiment is also preferred, wherein each of the layers has endless fibers or endless fiber bundles as reinforcing fibers. Furthermore, a profile part is preferred, wherein at least one of the layers has a thermoplastic as a matrix material. Thermoplastics have the advantage, particularly compared with thermosets, that they can be recycled into a high-quality, fiber reinforced plastic granulate, which can be subsequently reused—in particular in an injection molding method. Preferably, all layers of the profile part have a thermoplastic as a matrix material. Thus, it is possible using a thermoplastic as a matrix material for the profile part to achieve a significantly lower density at similarly favorable mechanical properties as when using aluminum.

For at least one of the layers, preferably for each layer, so-called hybrid fiber rovings are preferably used. This involves fiber bundles which consist of reinforcing fibers and fibers made of matrix material, in particular thermoplastic fibers, and/or of reinforcing fibers coated with matrix material, in particular with reinforcing fibers coated with thermoplastic, or of reinforcing fibers coated with matrix material, and additional fibers made of matrix material, in particular thermoplastic fibers. Here, the thermoplastic material, having the hybrid fiber roving used, and the matrix material of the final layer of the profile part are preferably identical, or it is possible that the complete matrix material of the layer is only introduced via the hybrid fiber roving. However, it is also possible that additional matrix material is introduced—in particular during consolidation of the profile part. In any case, the thermoplastic fiber components melt in the pultrusion process and are directly introduced as a matrix material. If needed, the amount of matrix material to be additionally introduced is reduced by means of this, if this is necessary at all. In addition to this, the flow paths for the matrix material shorten, whereby a qualitatively better matrix is formed. It is also possible for fiber tapes to be used for at least one layer.

Also preferred is an exemplary embodiment of the profile part, which is characterized in that the at least one parameter characterizing the layers is chosen from a group consisting of one kind of reinforcing fibers having the fiber reinforced plastic, of a matrix material of the fiber reinforced plastic, a type of arrangement of the reinforcing fibers, and of an arrangement pattern of the reinforcing fibers. Particularly referred to here with a type of the reinforcing fibers is the material of the reinforcing fibers, their strength or thickness, as well as their property as individual fibers or fiber bundles, or in particular hybrid rovings. It is possible that the profile part as reinforcing fibers has glass fibers, carbon fibers, ceramic fibers, metal fibers, natural fibers, aramid fibers, basalt fibers or other suitable fibers. Such fibers can also be readily combined with each other.

With the matrix material of the fiber reinforced plastic, the plastic in which the reinforcing fibers are embedded is referred to. As already mentioned above, this is preferably a thermoplastic. The matrix material may, in particular, be chosen from a group consisting of polyamide 6 (PA 6), polyamide 6.6 (PA 6.6), polyphthalamide (PPA), polyetheretherketone (PEEK), polyamide 12 (PA 12), polyimide, liquid crystal polymer (LCP), polyetherimide (PEI), polyphenylene sulphide (PPS), polysulphone (PSU), polybutylene terephthalate (PPT), polycarbonate (PC), polyoxymethylene (POM), polytetrafluoroethylene (PTFE), polymethyl methacrylate (PMMA), acrylnitrid-butadiene-styrene (ABS), polyphenylene ether (PPE), polyethylene (PE), polypropylene (PP), polyvinyl chloride (PVC), polystyrene (PS) and polyethylene terephthalate (PET), or a blend of ABS, PPE, or another suitable material.

With one type of arrangement of the reinforcing fibers, the way in which the reinforcing fibers are arranged during the production of the profile part is particularly referred to here, wherein this can occur in particular by braiding, laying, weaving, knitting, winding or in another suitable manner. In a particularly preferred exemplary embodiment, the reinforcing fibers of the profile part are braided or wound.

With one pattern of arrangement of the reinforcing fibers, a pattern is particularly referred to with which the fibers are arranged within the chosen arrangement type, such as a braid pattern, a laying pattern, a weaving pattern, a knitting pattern, a winding pattern, or another relevant pattern. It is particularly possible that an arrangement pattern of the reinforcing fibers is narrower or denser in one layer as an arrangement pattern in another layer. The terms "narrower" and "denser" here in particular refer to the fact that a greater number of reinforcing fibers or a larger proportion of reinforcing fiber material per unit area is provided in the pattern.

The profile part is preferably formed as a hollow part, in particular as a tubular hollow part. It preferably has a closed cross-section—seen in the circumferential direction. Different cross-sections are possible for the profile part, for example a circular cross-section, a rectangular cross-section, a square cross-section, an oval cross-section, a polygonal cross-section or any other suitable cross-sectional contour, especially in terms of further use of the profile part.

With a peripheral direction of the profile part, a direction is referred to here which concentrically encompasses a longitudinal direction pointing in the feed direction during the production of the profile part preferably produced as an endless profile. A radial direction is a direction which is perpendicular to the longitudinal direction.

An exemplary embodiment of the profile part is preferred, which is characterized in that—seen in radial direction—an innermost layer of the profile part, i.e., a layer facing the hollow interior of the profile part, has a matrix material that is chemically and/or physically similar to a matrix material of an outer—and in particular an outermost-layer of the profile part. The result of this, in particular for the stability of the profile part is a particularly favorable bonded connection of the two layers if they are immediately adjacent to one another. Otherwise, the advantage of comparatively homogeneous material properties of the profile part along the radial direction arises. An example of very chemically and physically similar matrix materials is formed by PA 6, on one hand, and PA 6.6, on the other hand.

Alternatively or additionally, the matrix material of the innermost layer preferably has a higher melting point, a higher glass transition temperature, a higher heat resistance, better media resistance, in particular resistance to chemicals, and/or a higher gas-tightness than the matrix material of the outer layer. Taken separately, each of these properties contributes to the fact that the matrix material of the innermost layer is particularly suitable for particularly favorably accommodating conditions occurring during an internal pressure deformation of the profile part and withstanding these undamaged, or at least without relevant changes to the material properties.

Alternatively or additionally, the matrix material of the innermost layer in comparison to the matrix material of the outer layer preferably has a lower moisture absorption level, higher strength and/or better damping properties. Also, each of these properties allows the inner layer to seem particularly resistant to media introduced into the profile part—in particular during internal pressure deformation.

An exemplary embodiment of the profile part is also preferred, which is characterized in that the matrix material of the innermost layer has a glass transition temperature of at least 115° C. Alternatively or additionally, the matrix material of the innermost layer preferably has a melting point of at least 260° C. Each of these properties also gives the matrix material of the inner layer a special aptitude for an internal pressure deformation of the profile part.

An exemplary embodiment of the profile part is also preferred, which is characterized in that these three layers—particularly preferably exactly and only three layers—namely have an inner layer, an intermediate layer and an outer layer. These are preferably specifically adapted to different functions within the profile part, in particular by appropriate choice of at least one of the parameters characterizing the layers.

The inner layer preferably has a matrix material having a melting point which is higher than the melting point of a matrix material of the outer layer. Preferably, the melting point of the matrix material of the inner layer is also higher than the melting point of the matrix material of the intermediate layer. In a preferred exemplary embodiment, it is provided that the outer layer and the intermediate layer have an identical matrix material. Thus, it is possible to precisely form the inner layer in particular as a bonded barrier for an internal pressure deformation of the profile part, wherein the two outer layers, i.e., the intermediate layer and the outer layer, do not have to have any corresponding properties. Rather, they can take on other functions in the profile part, giving it, for example, particular strength or rigidity. Furthermore, it is possible to choose the matrix material, in particular, for the outer layer or the intermediate layer cheaper than the matrix material for the inner layer, since only the matrix material of the inner layer is typically exposed to the conditions of the internal pressure deformation of the profile part, wherein the other layers do not have to withstand any corresponding conditions.

An exemplary embodiment of the profile part is preferred, which is characterized in that the intermediate layer has glass fibers as reinforcing fibers. Hereby, the intermediate layer can be produced with a particularly high stability and give the profile part high strength and rigidity. Alternatively or additionally, it is preferably provided that the inner layer and/or the outer layer has/have reinforcing fibers, which are chosen from a group consisting of carbon fibers, basalt fibers, and aramid fibers.

It is thus possible that additional fiber layers, individual fibers or fiber bundles of carbon fibers, aramid fibers, or basalt fibers are introduced between the glass fibers of the intermediate layer or between the glass fiber layers of the intermediate layer. These are preferably introduced as hybrid fiber rovings. Thus, highly variable and needs-optimized profile parts can be produced It is possible for the profile part to have more than three layers. Particularly preferred is a profile part having three different layers in terms of their function, and preferably also in terms of their material form, wherein it is possible for at least one of these different layers, in particular also each of the layers, to in turn have a plurality of layers which are identical in terms of corresponding function and/or in terms of their material form. A multi-layer structure of the profile part is therefore possible, wherein it can have three functional layers, in particular, each with a plurality of layers.

In a preferred exemplary embodiment, it is provided that the outer layer and/or the intermediate layer has/have a matrix material, which is chosen from a group consisting of PA 6, PE, PP, PVC, PS, PA and PET. The inner layer preferably has a matrix material which is chosen from a group consisting of PA 6.6, PPA, PEEK, PA 12, polyimide, LCP, PEI, PPS, PSU, PBT, PC, POM, PTFE, PMMA, ABS, PPE, and a blend of ABS, PPE. An exemplary embodiment is also particularly preferred wherein the outer layer and/or the intermediate layer particularly preferably has/have a matrix material, which is PA or PA6. Furthermore, an exemplary embodiment is preferred, which is characterized in that the inner layer has a matrix material which is chosen from a group consisting of PA 6.6, PA 12, PPA, PEEK, polyimide, LCP, PEI, PPS, and PSU.

Also preferred is an exemplary embodiment of the profile part, which is characterized in that the outer layer and the intermediate layer have PA 6 as a matrix material, wherein the inner layer has PA 6.6 or PPA as a matrix material. It is thus ensured in a particularly suitable manner that the inner layer has better mechanical properties, a lower moisture absorption, better media resistance, a higher melting point and a higher glass transition temperature than the matrix material of the outer layer and the intermediate layer. Thus, the inner layer is adapted to its use as a support layer in a particularly suitable way, in particular during an internal pressure deformation of the profile part.

An exemplary embodiment of the profile part is also preferred which is characterized in that the reinforcing fibers of at least one of the layers are braided. In particular, the reinforcing fibers of all layers of the profile part are preferably braided. In particular here, an embodiment of the profile part is preferred in which it is provided that a weaving pattern of the inner layer is denser or narrower than a braid pattern of the outer layer. Preferably, the weaving pattern of the inner layer is also denser or narrower than a braid pattern of the intermediate layer. In this way, a specially braided and as dense as possible pattern can be chosen for the inner layer, which makes it particularly suitable for the internal pressure deformation of the profile part.

Also preferred is an exemplary embodiment of the profile part, which is characterized in that the profile part is produced in a braid pultrusion method. The profile part is particularly preferably produced in a method in which the reinforcing fibers are braided as endless fibers on a stationary braiding mandrel, which is not used as a lost braiding mandrel but rather remains in the braiding unit. The reinforcing fibers are thus braided onto a stationary braiding mandrel or braided core, wherein the profile part is produced as a hollow profile in a subsequent consolidation step. The impregnation and consolidation can take place in the braid pultrusion.

Particularly preferably, the profile part is produced in a method as described in the German patent application DE 10 2011 018 422 A1.

In particular, preferably a thermoplastic FRP hollow profile is continuously produced as a profile part in a braid pultrusion machine within the scope of a braid pultrusion method (braiding, UD braiding, winding) with the following steps: a multi-layer hollow profile braid is produced from a plurality of hybrid rovings or fiber tapes, wherein the hybrid rovings or fiber tapes comprise reinforcing fibers and thermoplastic matrix material. The multi-layered hollow profile braid is produced on a braiding mandrel by a braiding machine, having at least two braiding wheels. The hollow profile braid is removed from the braiding mandrel and fed in through a feed in matrix into the consolidation tool of the braid pultrusion machine by means of an extraction device downstream from the consolidation tool. An anti-friction coating is produced from the thermoplastic matrix material around the hollow profile braid, wherein the thermoplastic matrix material of the anti-friction coating exists heated at least up to a glass transition temperature of the thermoplastic matrix material. The hollow profile braid is impregnated in the consolidation tool with the matrix material and consolidated, wherein the consolidation tool has tempering devices.

The invention also includes a corresponding production method for producing the profile part, in particular a braid pultrusion method.

It is possible for molten matrix material to be supplied to the hollow profile braid for producing the anti-friction coating at the entry of consolidation tool, in particular directly after the feed in matrix.

An exemplary embodiment of the profile part is also preferred, which is characterized in that it is overmolded and/or back injection molded at least in regions with a plastic, in particular a thermoplastic. Here, preferably at least one connecting element is connected to the profile part by overmolding or back injection molding. The profile part is particularly preferably overmolded or back injection molded at least in regions with a fiber reinforced plastic, in particular with a short fiber reinforced plastic, and particularly preferably with a short fiber reinforced thermoplastic. Connecting elements produced in this way are used to connect the profile part to an adjacent component in an assembly, such as a motor vehicle body. Thus, the profile part is preferably connected in a bonded manner via plastic back injection moldings to adjacent panelling parts, which are preferably formed from an organic sheet and/or injection molding, wherein it supports the occurring construction loads.

Finally, a profile part is preferred, which is characterized in that it is formed as a support tube or assembly support for a vehicle, especially for a motor vehicle, particularly preferably for a heavy goods vehicle. Particularly preferably, it is designed as a support tube or assembly support for a panelling part of a vehicle body, in particular for the front-end hatch of a heavy goods vehicle.

The invention is explained in more detail below by means of the drawings.

BRIEF DESCRIPTION OF THE DRAWINGS

FIG. 1 is a schematic depiction of an exemplary embodiment of a profile part in the longitudinal section;

FIG. 2 is a schematic cross-sectional depiction of the profile part according to FIG. 1.

DETAILED DESCRIPTION OF THE DRAWINGS

Figure 3:
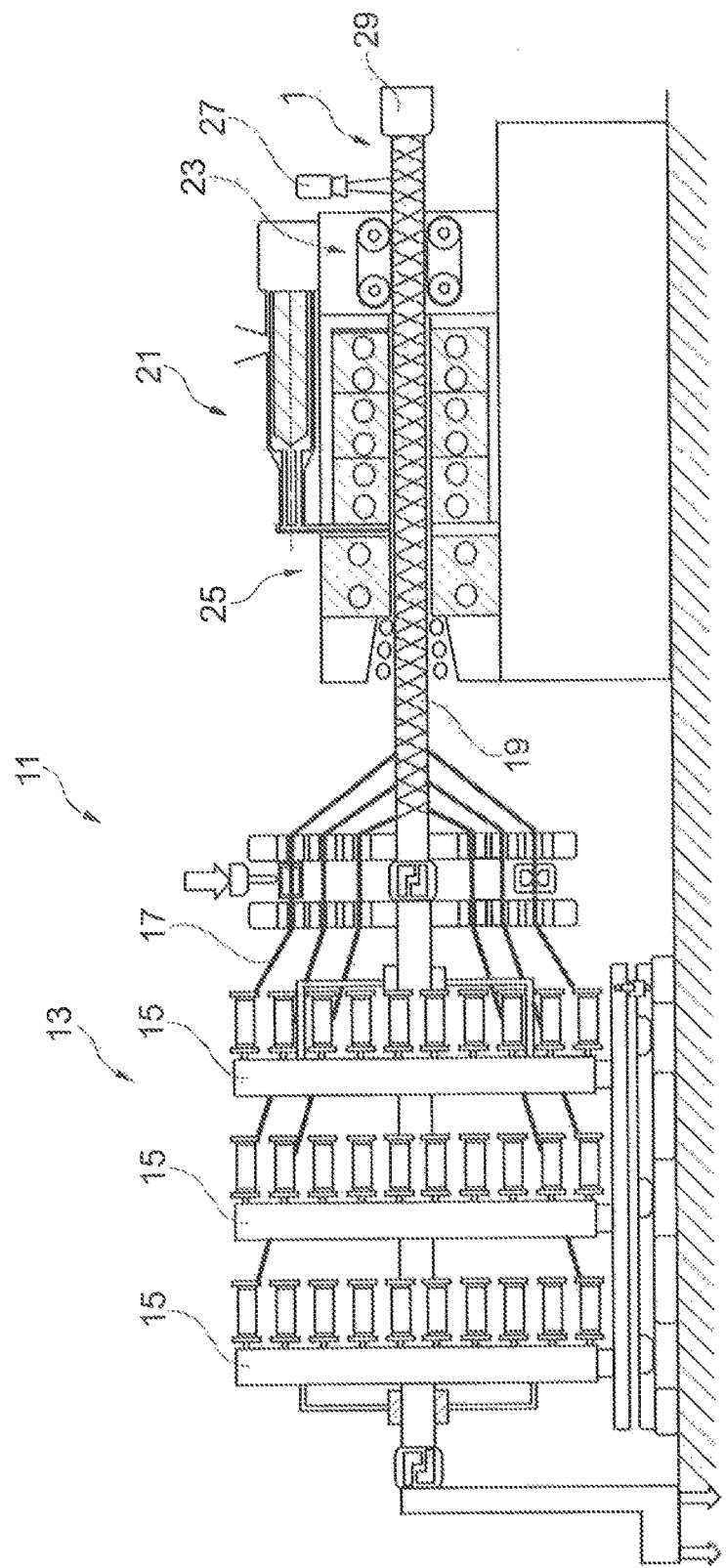
FIG. 3 is a schematic depiction of an embodiment of a production method for the profile part in accordance with FIGS. 1 and 2.

FIG. 1 shows a schematic depiction of an exemplary embodiment of a profile part 1 in the longitudinal section.

The profile part 1 is preferably produced as an endless profile, and cut to a certain length. Here, a longitudinal axis L of the profile part 1 preferably corresponds to a feed direction or removal direction of the profile part 1 during the production of the endless profile.

The profile part 1 here is a hollow tubular profile with—as shown in FIG. 2—a circular cross-section, having a plurality of layers, namely here exactly three layers, namely an inner layer 3, an intermediate layer 5 and an outer layer 7. It is possible that at least one of these layers, if necessary more than one of these layers, and in particular, each of these layers, has a plurality of layers which are then preferably identical in terms of their function and/or their material form within the respective layer. In contrast to this, the different layers, namely the inner layer 3, the intermediate layer 5 and the outer layer 7 differ in terms of their function for the profile part 1, and in particular with regard to at least one of the parameters which characterizes the various layers. This parameter is particularly chosen with regard to the various functions of the layers.

Each of the layers, namely the inner layer 3, the intermediate layer 5 and the outer layer 7 has a fiber reinforced plastic, or preferably consists of a fiber reinforced plastic. In particular, it is an endless fiber reinforced plastic, wherein the reinforcing fibers are braided—in particular as hybrid fiber rovings.

In the specific exemplary embodiment depicted here, the outer layer 7 has reinforcing fibers, which are formed as carbon fibers, as basalt fibers, and/or aramid fibers. A combination of these fiber types is possible. The outer layer preferably has PA 6 as the matrix material.

The intermediate layer 6 is preferably formed as a glass fiber reinforced layer, thus has glass fibers as reinforcing fibers. It is possible that additional carbon fibers, aramid fibers and/or basalt fibers are introduced into the glass fiber layer, in order to flexibly adapt their properties. The intermediate layer 5 preferably has PA 6 as the matrix material.

Thus, it is shown that in the exemplary embodiment depicted here, preferably the intermediate layer 5 and the outer layer 7 have an identical matrix material, in particular PA 6.

In the exemplary embodiment shown here, the inner layer 3 has a matrix material, which has a higher melting point than the matrix material of the intermediate layer 5 and the outer layer 7. Particularly preferably, the inner layer 3 has PA 6.6 or PPA as a matrix material. Carbon fibers, basalt fibers, aramid fibers and/or glass fibers are possible as reinforcing fibers for the inner layer. Furthermore, the inner layer 3 preferably has a braid pattern, which is different from the weaving pattern for the intermediate layer 5 and the outer layer 7, wherein it is particularly denser or narrower than the braid/winding pattern for the intermediate layer 5 and the outer layer 7.

It is shown that the inner layer 3 is specifically adapted to withstand the conditions that exist during the internal pressure deformation of the profile part 1.

FIG. 2 shows a schematic cross-sectional view of the exemplary embodiment of the profile part 1 according to FIG. 1. Elements that are the same and elements with the same function are provided with the same reference numerals, so as to reference the preceding description in this respect. It is shown that the profile part 1 is formed as a tubular profile part with a circular cross-section here. Referred to here are compressive forces in an interior 9 enclosed in the layers of the profile part 1 by arrows P pointing radially outwards, of which for purposes of clarity, only one is referred to here with the reference character P.

The compressive forces act on the inner layer 3 during the internal pressure deformation of the profile part 1. This inner layer 3 serves as a supporting and protective layer against the internal pressure and the heat, which is applied to the profile part 1 during the internal pressure deformation, in particular by the inner layer 3 having a higher melting point and, preferably, a higher glass transition temperature in terms of the matrix material than the intermediate layer 5 and the outer layer 7.

FIG. 3 shows a schematic depiction of an embodiment of a method for the production of the profile part 1 according to FIGS. 1 and 2. Here, it is shown that a braid pultrusion device 11 is used for producing the profile part 1, the braid pultrusion device 11 having a braiding unit 13 with a plurality of braiding wheels 15, wherein hybrid fiber rovings, of which for purposes of clarity, only one is referred to here with the reference numeral 17, are braided onto a fixed, stationary braiding mandrel 19. During this, a multi-layer hollow braid profile is produced which is removed from the braiding mandrel 19 by removal means 23 assigned to a pultrusion unit 21 and in fed into a consolidation tool 25. In the consolidation tool 25, an anti-friction coating is produced from a thermoplastic matrix material around the hollow profile braid. The endless profile further transported by the removal means 23 is preferably tested by a testing device 27 and if necessary, post-molded in a post-molding device 29. It is particularly possible here that the cross-section of the endless profile and/or its course is changed—in particular by bending Preferably, a separating device, not shown, is also provided, through which the endless profile produced in such a way is cut into individual profile parts.

Overall, it is shown that within the scope of the method, a highly specific profile part 1 adapted to a provided post-processing and/or usage procedure is created. This means in particular that the weight and costs associated with the profile part 1 can be reduced. Thus, it is also particularly possible to reduce the cost and the weight of a front-end hatch of a heavy goods vehicle.

With the profile part 1, an ideal torsion-resistant and bending-resistant closed hollow profile is created, which can be produced in a manufacturing process which is suitable for a series production and is highly integrated. Here, a material recycling oriented concept can be realized, wherein technically usable reinforced plastic granules can be produced within the framework of this recycling process. By integrating all of the production processes into a so-called one-shot process, considerable cost and energy savings result. Regarding the profile part 1, an increase in performance due to the integration of different materials for needs-dependent properties results, in particular increased strength and/or rigidity.

In particular, the profile part 1 can be formed to be impermeable to gas by specifically adapting the inner layer of the profile part 1, whereby an internal pressure deformation method is possible for the profile part 1, but also overmolding with plastic. The profile part 1 is media-resistant and temperature-resistant. NVH properties of the profile part 1 (Noise, Vibration, Harshness) are also reduced or improved.

The invention claimed is:

1. A profile part, comprising:
   a plurality of layers, wherein each of the plurality of layers has a fiber reinforced plastic and wherein at least two of the plurality of layers differ in terms of at least one parameter that characterizes the plurality of layers, wherein the profile part has three layers, wherein the three layers are an inner layer, an intermediate layer, and an outer layer, and wherein the inner layer comprises a matrix material having a melting point which is higher than a melting point of a matrix material of the outer layer, wherein the intermediate layer has glass fibers as reinforcing fibers, wherein the inner layer and/or the outer layer has/have reinforcing fibers which are carbon fibers, or basalt fibers, or aramid fibers, and wherein the outer layer and the intermediate layer have PA 6 as a matrix material and wherein the inner layer has PA 6.6 or PPA as a matrix material.

2. The profile part according to claim 1, wherein a matrix material of the inner layer of the plurality of layers has a glass transition temperature of at least 115° C. and/or a melting point of at least 260° C.

3. The profile part according to claim 1, wherein reinforcing fibers of the fiber reinforced plastic are wound/braided and wherein a braiding/winding pattern of the inner layer is denser than a braid pattern of the outer layer.

4. The profile part according to claim 1, wherein the profile part is produced in a braid pultrusion method or braiding/winding.

5. The profile part according to claim 1, wherein the profile part is formed as a support tube or assembly support for a motor vehicle.

6. The profile part according to claim 5, wherein the motor vehicle is a heavy goods vehicle.

* * * * *